United States Patent
Du

(10) Patent No.: US 6,650,082 B1
(45) Date of Patent: Nov. 18, 2003

(54) FAST ROTOR POSITION DETECTION APPARATUS AND METHOD FOR DISK DRIVE MOTOR AT STANDSTILL

(75) Inventor: Tan Du, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/626,730

(22) Filed: Jul. 27, 2000

(51) Int. Cl.⁷ .............................. H02P 1/46; H02P 3/18; H02P 5/28; H02P 1/36
(52) U.S. Cl. ............................................. 318/701
(58) Field of Search .................... 318/138, 254, 318/439, 701, 696, 431; 310/179, 162, 166, 184, 185, 168, 90.5

(56) References Cited

U.S. PATENT DOCUMENTS

| | | | |
|---|---|---|---|
| 4,384,244 A | * 5/1983 | Matsumoto ................. 318/803 |
| 4,772,839 A | 9/1988 | MacMinn et al. | |
| 5,028,852 A | 7/1991 | Dunfield | |
| 5,057,753 A | 10/1991 | Leuthold et al. | |
| 5,180,960 A | * 1/1993 | Austermann ................. 318/701 |
| 5,191,270 A | 3/1993 | McCormack | |
| 5,327,053 A | 7/1994 | Mann et al. | |
| 5,343,127 A | * 8/1994 | Maiocchi ..................... 318/254 |
| 5,382,889 A | 1/1995 | Peters et al. | |
| 5,384,527 A | 1/1995 | Rozman et al. | |
| 5,530,326 A | 6/1996 | Galvin et al. | |
| 5,545,938 A | * 8/1996 | Mecrow ....................... 310/156 |
| 5,569,990 A | * 10/1996 | Dunfield ...................... 318/254 |
| 5,600,218 A | 2/1997 | Holling et al. | |
| 5,717,298 A | * 2/1998 | Tang et al. .................. 318/254 |
| 5,739,662 A | * 4/1998 | Li ................................. 318/791 |
| 5,811,905 A | * 9/1998 | Tang ........................... 310/179 |
| 5,838,087 A | * 11/1998 | Tang ........................... 310/168 |
| 5,889,347 A | * 3/1999 | Tang et al. .................. 310/165 |
| 5,929,590 A | * 7/1999 | Tang ........................... 318/701 |
| 5,936,373 A | * 8/1999 | Li et al. ...................... 318/701 |
| 5,990,643 A | 11/1999 | Holling et al. | |
| 6,014,006 A | * 1/2000 | Stuntz et al. ................ 318/804 |
| 6,020,665 A | * 2/2000 | Maurio et al. .............. 310/90.5 |
| 6,078,122 A | * 6/2000 | Tang et al. .................. 310/165 |
| 6,242,884 B1 | * 6/2001 | Lipo et al. ................... 318/808 |

\* cited by examiner

*Primary Examiner*—Jeffrey Donels
(74) *Attorney, Agent, or Firm*—W. Daniel Swayze, Jr.; W. James Brady; Frederick J. Telecky, Jr.

(57) ABSTRACT

The invention includes a method and apparatus for detecting the position of a stationary rotor in a polyphase electric motor. The method includes providing one or more short duration voltage pulses to the motor and determining the rotor position based on measurements of one or more phase voltages. The invention allows identification of a region in which the rotor is positioned, through polarity sensing, whereby the rotor position may be quickly and accurately determined, to allow a stationary electric motor to be properly energized to rotate in a desired direction.

27 Claims, 13 Drawing Sheets

FAST ROTOR POSITION DETECTION APPARATUS AND METHOD FOR DISK DRIVE MOTOR AT STANDSTILL

TECHNICAL FIELD

This invention relates generally to the field of electric motor driving systems, and more particularly to a method and apparatus for fast rotor position detection for disk drive motors at standstill.

BACKGROUND OF THE INVENTION

Electric motors include a rotor and a stator having a plurality of wound field coils. Brushless DC motors are electronically commutated, wherein solid-state switching replaces the brushes and segmented commutators of traditional permanent magnet DC motors. Brushless motors may be of the variable reluctance, permanent magnet, or hybrid type. Variable reluctance brushless motors are characterized by having an iron core rotor follow or chase sequentially shifting magnetic fields of the stator coils to facilitate rotational motion of the rotor. Permanent magnet brushless motors are characterized by having the sequentially energized field coils attract or repel a permanent magnet rotor into rotational motion.

Electric motors are used to rotate loads in a variety of applications. One such application is in mass storage devices, such as hard disk drives. A hard disk drive generally includes a stack of rotating disks or platters and a spindle motor, which may be a salient pole brushless DC motor, for rotating the disks. The drive also includes one or more electromagnetic read/write heads which fly above the surface of the disks, an actuator motor (also known as a voice coil motor or VCM) which controls the positioning of the read/write heads, power circuitry to provide electrical power to the spindle and voice coil motors, circuitry for processing the data read from and/or written to the drive, and control circuitry to control the operation of the spindle and voice coil motors. The platters are typically rotated at a generally constant angular speed while the read/write heads read from or write to circular tracks on the platters. The mass storage device spindle motors are commonly multiple phase motors including a permanent magnet rotor and three electrical windings. The three electrical windings are related to the three phases of the motor. Three phase currents flow through the motor windings, typically at a 120 electrical degree phase relationship with respect to one another. The phase currents create a rotating electric field which causes angular rotation of the permanent magnet rotor.

The electromagnetic read/write heads read data from a disk platter by sensing flux changes on the magnetic surface of the platter as it passes beneath the read/write head. In order to synchronize the data being read from the disk with the operation of the data processing circuitry, it is necessary to carefully control the rotational speed of the disks. This is accomplished by controlling the current delivered to the spindle motor phase windings. The phase currents may be generated by the control circuitry in a variety of fashions. One method is to provide pulse-width-modulated (PWM) signals to the motor windings, wherein the timing of the individual PWM signals provided to each motor phase is determined by a control circuit. The duty cycle of the pulse width modulation signal therefore determines the average current delivered to the spindle motor. Another mode of current control is known as linear current control. The spindle motor control circuitry adjusts the level of current delivered by the power circuitry according to a desired motor performance parameter, such as speed and/or position.

Power is delivered to the motor phases through selectively energizing and de-energizing the individual phase windings. This process is known as commutation, and is accomplished via the control circuit. In order to rotate the disk drive motor in a given direction from startup and to maintain a desired rotational speed and torque at steady state, a commutation sequence or scheme is employed according to the present rotor position. This ensures that the proper phase windings are energized at appropriate times and polarities in order to provide the mutual attraction and/or repulsion between the phase windings and the rotor magnetic poles which results in the desired angular rotor motion.

To ensure proper rotational movement, it is essential to determine the position of the rotor with respect to the de-energized stator windings (or with respect to the energized windings). By knowing this position (sometimes referred to as commutation position), the stator windings can be energized in the appropriate sequence to create a revolving magnetic field in the motor to exert the desired rotational torque on the rotor. Rotor position has previously been detected by employing one or more transducers within the motor to sense the position of the rotor relative to the active stator windings.

However, the use of such transducers to determine commutation position has several drawbacks. First, these sensors increase production costs due to the need for sophisticated positional adjustment and increased wiring. Moreover, the space required for commutation position sensors is also a significant disadvantage in that valuable space is consumed within the motor housing. With an ever-increasing premium on space and cost efficiency, several attempts have been made to create sensorless commutation position feedback systems to replace the need for commutation position sensors within such motors.

The commutation control circuit is provided with rotor position information feedback (as well as rotor speed information), which is used to generate appropriate commutation signals for the motor windings. This position information may be obtained from some form of position sensor, or from measurements of back electromotive force (emf). Rotational position sensors include hall effect devices, magnetic sensors, optically encoded disks, resolvers, and other devices providing an indication of the relative positions of the rotor and stator to the control circuit via separate sensor signals. These devices, however, add to the cost and complexity of a motor, as well as occupying valuable physical space.

In mass storage devices such as high density disk drives, it is desirable to prevent a stationary spindle motor from starting in the wrong rotational direction. Accordingly, the rotor position is typically determined prior to moving the rotor, so that an appropriate commutation sequence may be employed at startup. In conventional disk drives, the stationary rotor position determination is typically accomplished by providing six sequential current pulses to the motor phases. These current pulses may be provided via the application of long duration voltage pulses which saturate the flux or field associated with the energized winding. For example, two such long duration voltage pulses of opposite polarity are commonly provided to each phase pair in a three phase motor.

The rise times of the resulting currents have been heretofore measured and compared in order to determine the rotor position within a given accuracy. For example, many such rotor position methods determine the rotor location by assuming that a motor phase winding with the shortest measured rise time associated therewith is the phase closest to a rotor magnetic pole. The current pulse method is based on saturation of the field or flux associated with a motor winding. The current pulse method therefore requires that the applied energy have a long enough duration to provide the saturation. When saturation occurs, the inductance of an energized winding decreases, resulting in a decreased rise time (e.g., related to L/R). The winding closest to a rotor pole will tend to saturate faster than will the other windings. The fastest rise time may be determined, for example, by measuring the time it takes for each current to rise to a certain threshold value. Alternatively, the resulting current with the largest or highest peak may be used to identify the winding closest to a rotor pole.

In a typical three phase motor, conventional stationary rotor position detection methods are able to determine the rotor position within 60 electrical degrees for a three phase motor. However, improved position detection accuracy is desirable. In addition, the prior current pulse method is time consuming. In advanced mass storage disk drive spindle motor applications, there is a need for faster motor startup. The current pulses of the prior method must be long enough to affect the motor flux saturation, in order to indicate rotor position. The six current pulse methods of conventional systems therefore do not provide for fast stationary rotor position detection.

SUMMARY OF THE INVENTION

The present invention provides an improved apparatus and methodology for determining the position of a stationary rotor in a polyphase electric motor which overcomes or minimizes the shortcomings of the prior art. In particular, the invention provides for a faster stationary rotor position determination than was possible in conventional systems. The method includes measuring a mutual inductance of the motor, and/or a voltage signal related to mutual inductance; and determining the stationary rotor position according to the measured mutual inductance. According to one aspect of the present invention, the mutual inductance measurement may be accomplished, for example, by applying a voltage pulse across a pair of phases and measuring a floating phase voltage. The inventive method includes very short voltage pulses (e.g., less than about 0.01 ms), which are significantly shorter than are the current pulses of the prior art.

For a three phase motor, the method may include measuring first, second, and third mutual inductances associated with the first, second, and third phases, respectively, and determining the rotor position according to the first, second, and third mutual inductances. The mutual inductances may be measured by applying a first voltage pulse across the second and third phases while measuring a first floating phase voltage across the first phase, applying a second voltage pulse across the third and first phases while measuring a second floating phase voltage across the second phase, and applying a third voltage pulse across the first and second phases while measuring a third floating phase voltage across the third phase.

The polarity of the measured floating phase voltages may also be measured, whereby determining the rotor position according to the measured mutual inductance comprises identifying a motor phase closest to a proximate rotor pole according to the floating phase voltage polarity measurements. The inventors of the present invention have found that the equivalent mutual inductance of a pair of energized phase windings with respect to a floating phase is a periodic function of rotor position at a given current range, having alternating positive and negative polarities. Accordingly, the application of a short voltage pulse creates a measurable voltage (e.g., related to the product of the mutual inductance and the di/dt created by the voltage pulse) having a polarity associated therewith. In this way, the floating phase voltage measurements, and/or a polarity associated therewith, may be correlated to one of six positional regions or rotor locations with respect to the stator phases. In addition, the six positional regions may each comprise two 30 degree electrical angular partitions on opposite sides of the motor.

According to another aspect of the invention, the method may further include injecting first and second current pulses or long duration voltage pulses of opposite polarity into a pair of motor phases, and measuring first and second rise times or peak vales associated with resulting first and second currents. From these measurements, the polarity of the proximate rotor pole may be determined according to the first and second rise times or peak values associated with the resulting first and second currents.

In accordance with yet another aspect of the invention, there is provided another method of detecting a stationary rotor position in a polyphase electric motor having first, second, and third phases. The method includes applying a first voltage pulse across the second and third phases while measuring a first floating phase voltage across the first phase, applying a second voltage pulse across the third and first phases while measuring a second floating phase voltage across the second phase, applying a third voltage pulse across the first and second phases while measuring a third floating phase voltage across the third phase, and determining the stationary rotor position according to the measured first, second, and third floating phase voltages.

The applied voltage pulses may have a duration of less than about 0.01 ms, and the polarities of the first, second, and third floating phase voltages may be measured. Using the measured polarities, one of the three phases may be identified as being closest to a proximate rotor pole. In this manner, the first, second, and third floating phase voltage polarity measurements may be correlated with one of six positional regions, which may represent two 30 degree electrical angular partitions on opposite sides of the motor. In this way, a fast rotor position detection methodology is provided, which achieves accurate results in less time than was previously possible using six current pulses.

According to still another aspect of the invention, an apparatus is provided for detecting a stationary rotor position in a polyphase electric motor having first, second, and third phases. The apparatus comprises a first circuit adapted to apply a first voltage pulse across the second and third phases and to measure a first floating phase voltage across the first phase. The first circuit is further adapted to apply a second voltage pulse across the third and first phases and to measure a second floating phase voltage across the second phase, as well as to apply a third voltage pulse across the first and second phases and to measure a third floating phase voltage across the third phase. The apparatus also includes a second circuit adapted to determine the stationary rotor position according to the measured floating phase voltages.

In this regard, the first circuit may be adapted further to measure the polarity of the floating phase voltages, whereby the second circuit may identify one of the first, second, and third phases as a motor phase closest to a proximate rotor pole according to floating phase voltage polarity measurements. This may be done by correlating the first, second, and third floating phase voltage polarity measurements with one of six positional regions, wherein the one of six positional regions represents two 30 degree electrical angular partitions on opposite sides of the motor.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The invention is directed to a method and apparatus for detecting the position of a stationary electric motor rotor to allow for proper startup commutation to start a motor in a desired direction. The invention employs short voltage pulses which enable rotor position detection in much less time than was possible in the prior art, as well as improved position determination accuracy. One or more aspects of the invention involve the measurement of mutual inductances associated with an electric motor, which have periodic relationships to rotor position, and which change polarity according to position. In the following description, the derivation of such mutual inductances and positional relationships are described in order to further illustrate the various aspects of the invention. While the various aspects of the invention are illustrated hereinafter with respect to certain motor winding configurations, it will be appreciated that the invention finds applications in association with other motor configurations, for example, delta wound motors, and the like.

Figure 1:
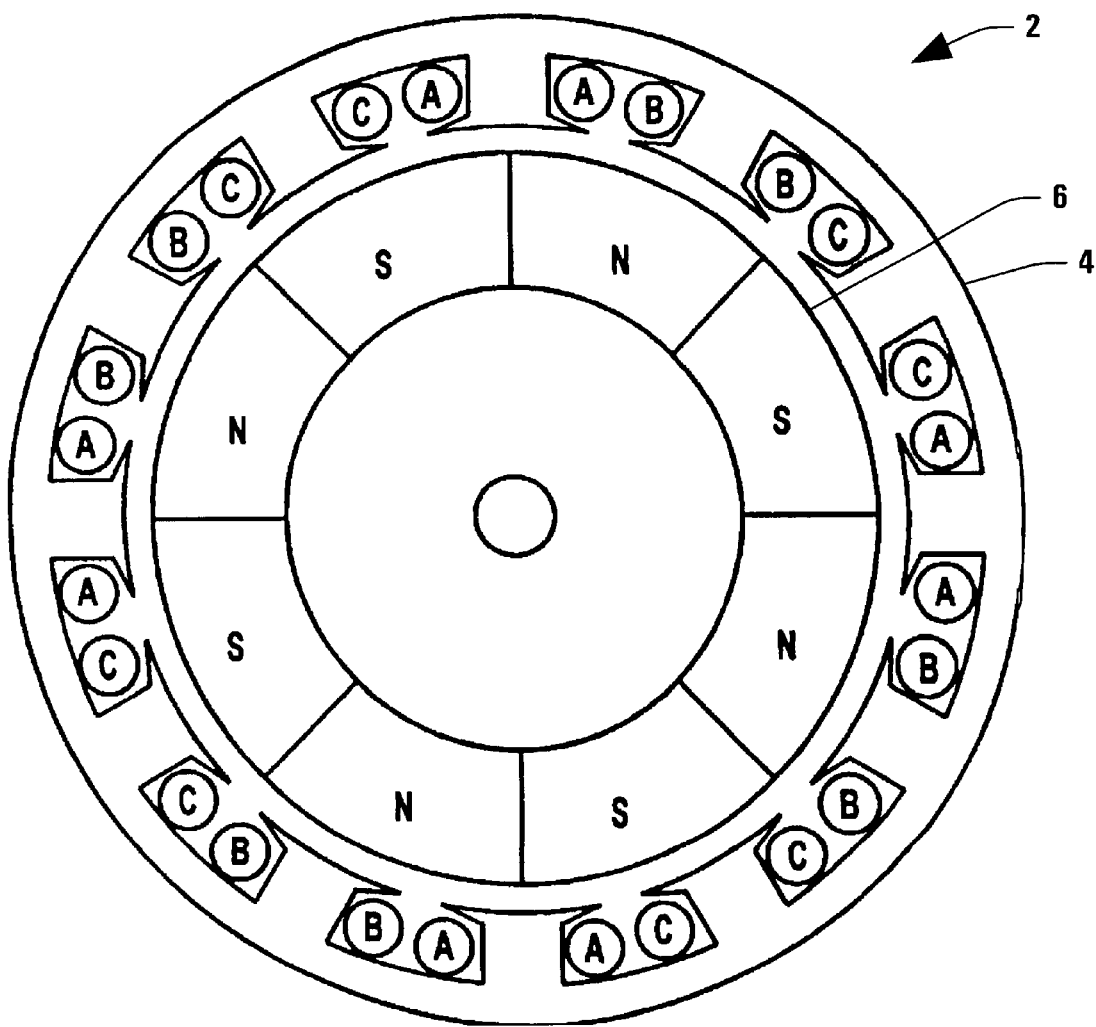
FIG. 1 is a sectional end elevation view of a polyphase electric motor having a permanent magnet rotor in which the principles of the present invention may be applied.

Referring now to FIG. 1, a typical polyphase motor 2 is illustrated having a stator 4 with a plurality of phase windings variously designated A, B, and C, which may be energized using corresponding phase taps (not shown) according to a commutation scheme. The commutation scheme may advantageously provide for appropriate windings A, B, and/or C to be energized at appropriate polarities such that mutual attraction and repulsion is provided between the resulting magnetic field and the permanent magnets of a rotor 6, having poles designated respectively as N and S. In this fashion, the rotor 6 may be made to rotate in a given angular direction in order to drive a load, such as a mass storage device platter.

Figure 2:
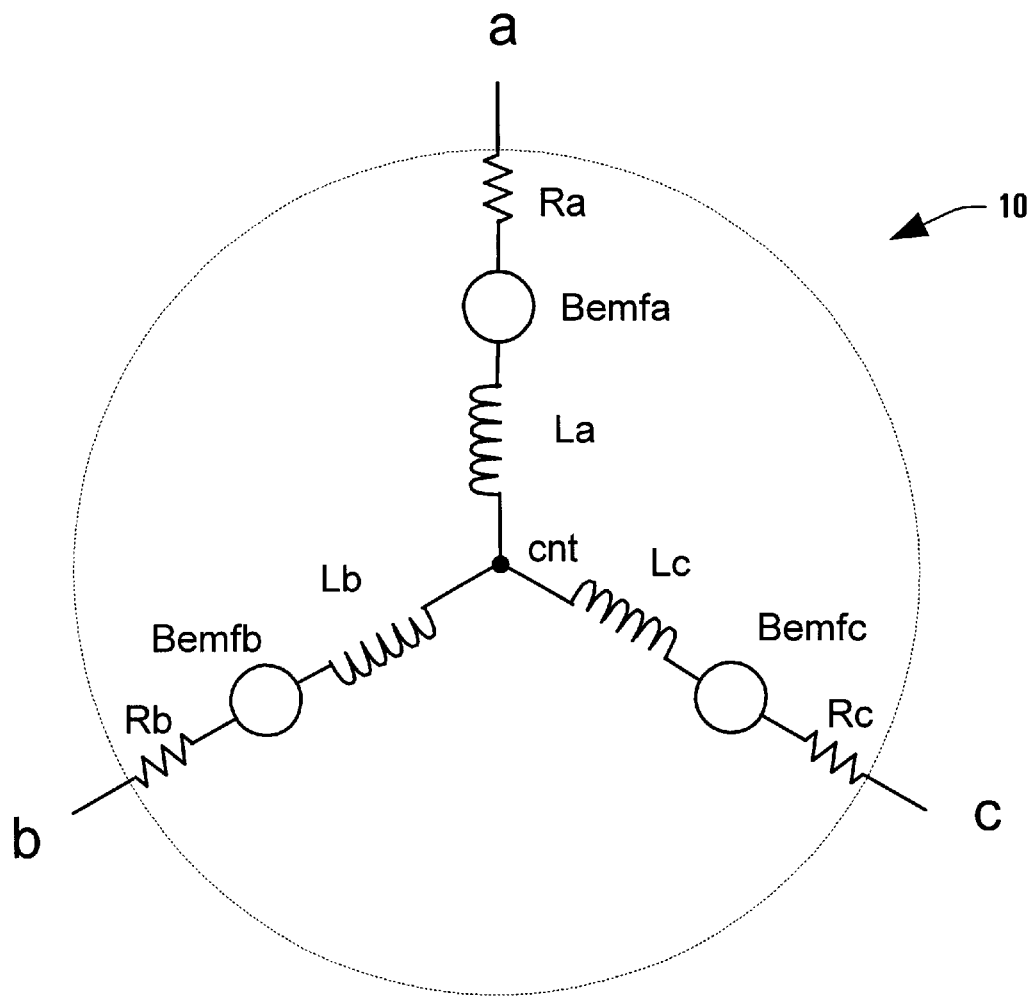
FIG. 2 is a schematic diagram illustrating a conventional three phase motor model.

FIG. 2 schematically illustrates a conventional three phase motor model 10 including phases a, b, and c having a resistance component, a back emf component, and a phase induction component, as well as a center tap cnt connecting the phases a, b, and c. For example, phase a includes a phase resistance Ra, a back electromotive force (emf) component Bemfa, and a phase inductance component La serially connected between phase tap a and the center tap cnt. In the past, the phase resistance components Ra, Rb, and Rc, as well as the phase inductance components La, Lb, and Lc have been assumed to be constant. In addition, it was previously assumed that the back emf components Bemfa, Bemfb, and Bemfc were a function of rotor speed only. However, several discrepancies have been found by the inventors of the present invention between the model 10 and actual motor performance. In particular, mutual inductance components have been identified in actual motors, through which actual rotor position may be more accurately determined.

Figure 3A:
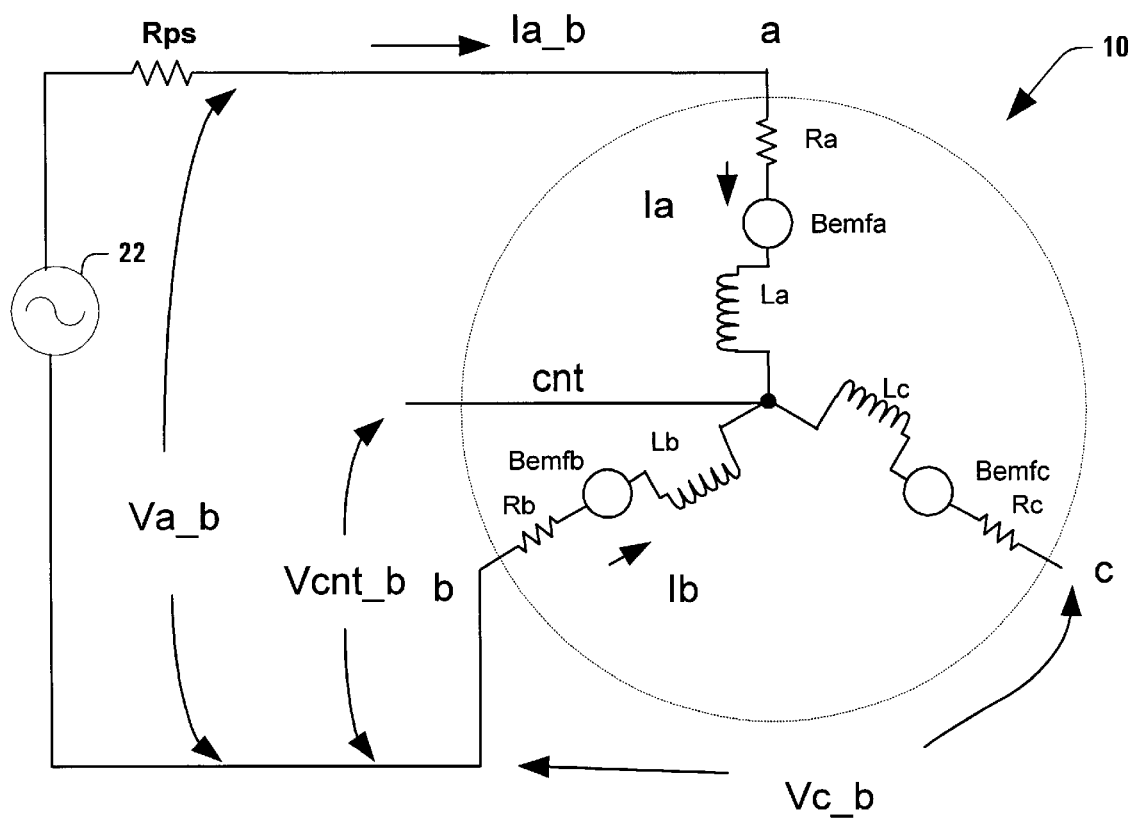
FIG. 3A is a schematic diagram illustrating a circuit for measuring the performance of a polyphase electric motor.

Referring now to FIG. 3A, a circuit 20 is illustrated for measuring the performance of or otherwise characterizing a polyphase electric motor. The circuit 20 includes a power source 22 with an output resistance Rps adapted to apply electrical power to two phases of an electric motor. In order to illustrate the shortcomings of the motor model 10 of FIG. 2, the power source 22 is connected to provide a voltage Va_b across phases a and b of motor model 10 while phase c is floated and the rotor is held stationary. The application of voltage Va_b causes current Ia_b (e.g.,=Ia =−Ib, as illustrated in FIG. 3A) to flow. Because the rotor is not moving, the back emf component Bemfc of the floating phase (e.g., phase c) is zero. Thus, according to the conventional model 10 of FIG. 2, the center tap voltage should be equal to one half of the applied phase to phase voltage Va_b, and the voltage between the center tap cnt and the floating phase tap c should be zero. However, the inventors of the present invention have found that this is not the case, as illustrated and described in greater detail hereinafter.

Figure 3B:
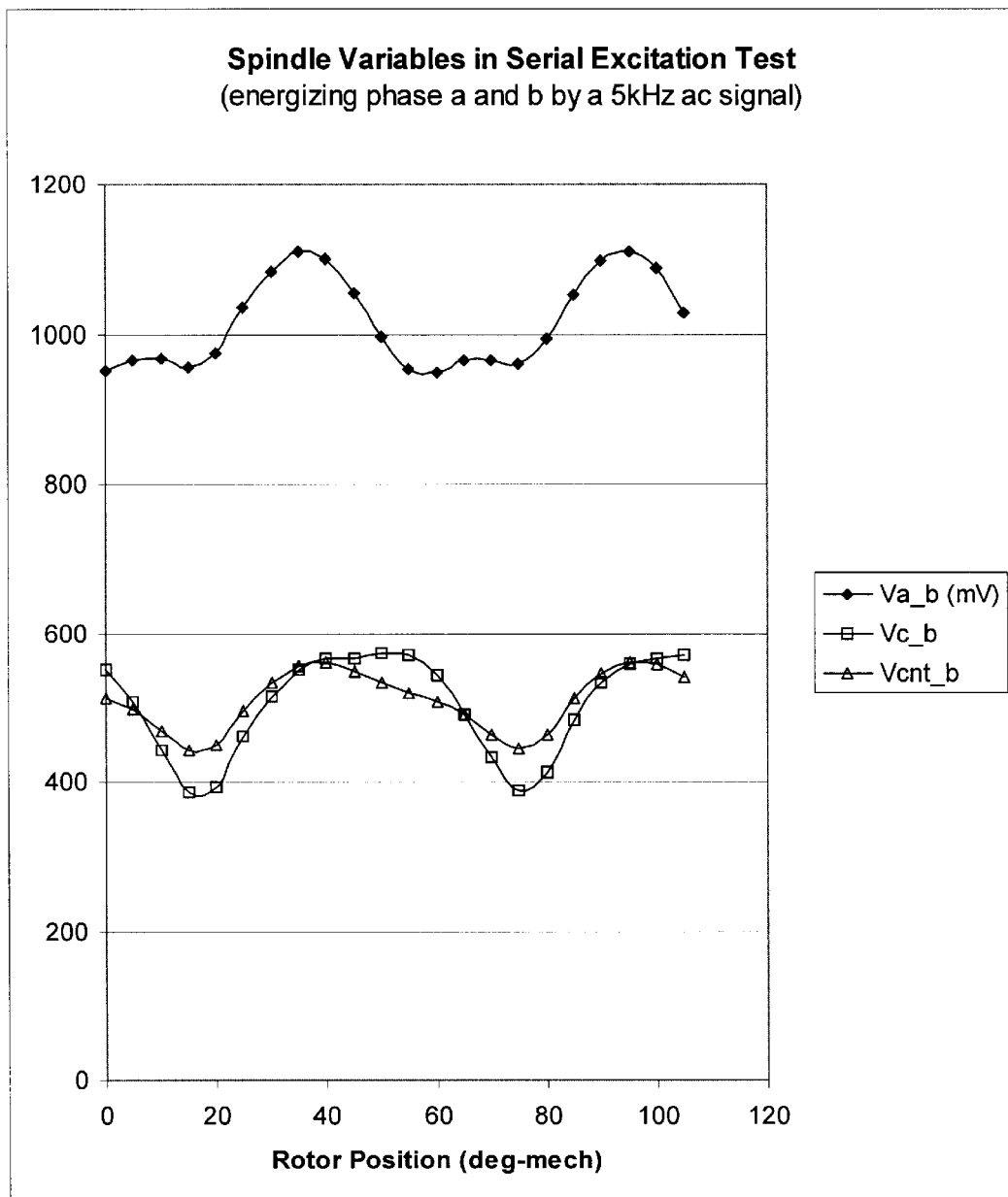
FIG. 3B is a graphical diagram illustrating three motor performance variables measured according to the circuit of FIG. 3A.

Referring also to FIG. 3B, a graph 30 illustrates the measured performance of a three phase spindle motor connected to the circuit 20 of FIG. 3A with respect to rotor position, wherein a 5 kHz current Ia_b has been applied to phases a and b while phase c is floated. The data was obtained at discrete rotor positions while the rotor itself was held stationary. It is noted from the graph 30 that the center tap voltage Vcnt_b is not one half of the phase voltage Va_b, but is instead variable with respect to the rotor position. In addition, the voltage between the center tap cnt and the floating phase tap c is not equal to zero, as would be expected from the conventional model 10. In particular, the model 10 leads one to expect that the voltage Vc_b between the floating phase c and the reference phase b minus the voltage Vcnt_b (Vc_b−Vcnt_b) would be zero since no back emf voltage exists in the floating phase c for a stationary rotor. However, as can be seen, the curves for Vc_b and Vcnt_b in FIG. 3B do not overlap. Consequently, the measurements of FIG. 3B show that the floating phase voltage varies with rotor position due to effects other than (or in addition to) back emf.

Figure 3C:
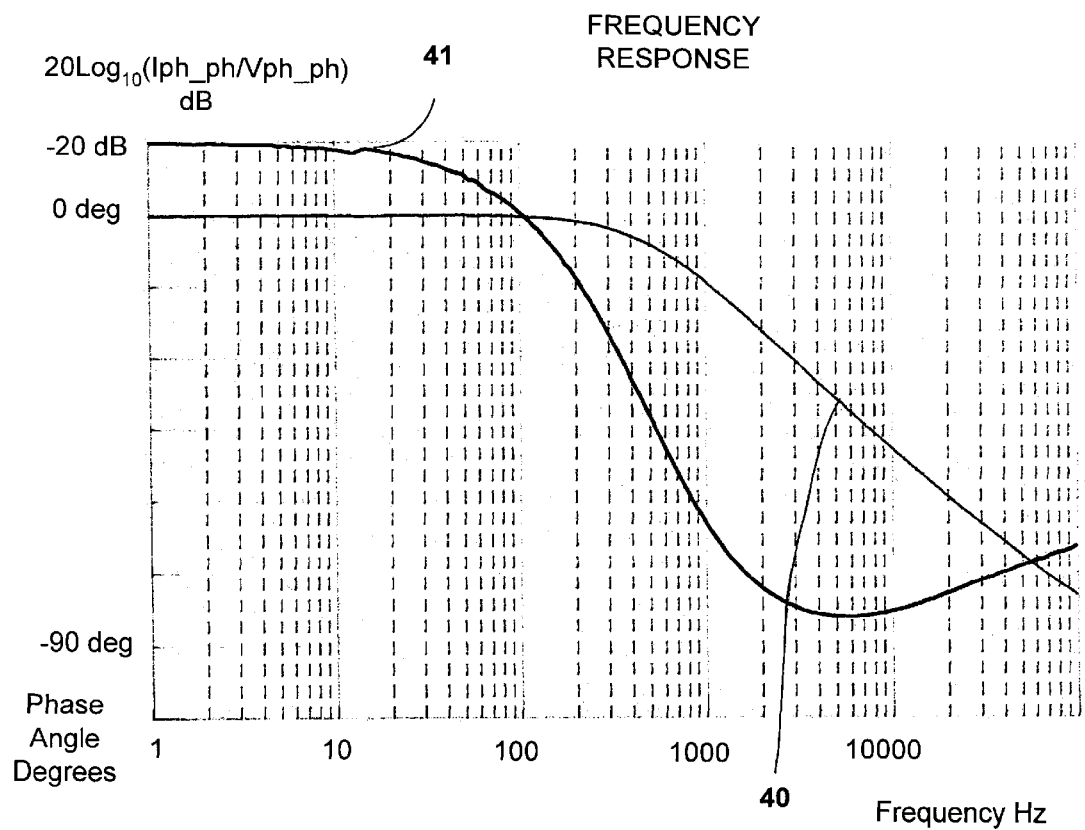
FIG. 3C is a Bode plot illustrating another motor performance variable measured according to the circuit of FIG. 3A.

In addition, the frequency response of an actual motor phase does not correlate with the conventional motor model 10. Referring to FIG. 3C, the inventors of the present invention measured the frequency response of a single phase (e.g., phase a, b, or c) of a motor by applying a phase to phase AC voltage Vph_ph (or phase to center tap voltage Vph_cnt) and measuring the resulting phase to phase current Iph_ph (or a phase to center tap current Iph_cnt) at various frequencies. The measurements were taken with floating phase a aligned with a rotor pole. The ratio 40 of the measured current (e.g., Ib_c) to the applied voltage (e.g., Vb_c) is plotted in FIG. 3C versus frequency, wherein the ratio is represented in dB ($20 \times \log_{10}$(Iph_ph/Vph_ph)) and the frequency axis is illustrated in a logarithmic scale. The phase relationship 41 between the applied voltage and the measured current is also plotted versus frequency.

The inventors of the present invention have thereby found that the Bode plot 40 of G(S)=Iph_ph/Vph_ph (or Iph_cnt/Vph_cnt) does not have a −20 dB per decade slope as would be expected from the model 10 of FIG. 2. Instead, the frequency response curve 40 has been found to have about a −17 dB per decade slope. In addition, the corner or 3 dB frequency of this frequency response curve has been found to be a function of the rotor position. Thus, the model 10 of FIG. 2 is inadequate to properly predict or simulate the actual behavior of polyphase motors in high accuracy control situations, such as high track density hard disk drive spindle motors.

Figure 3D:
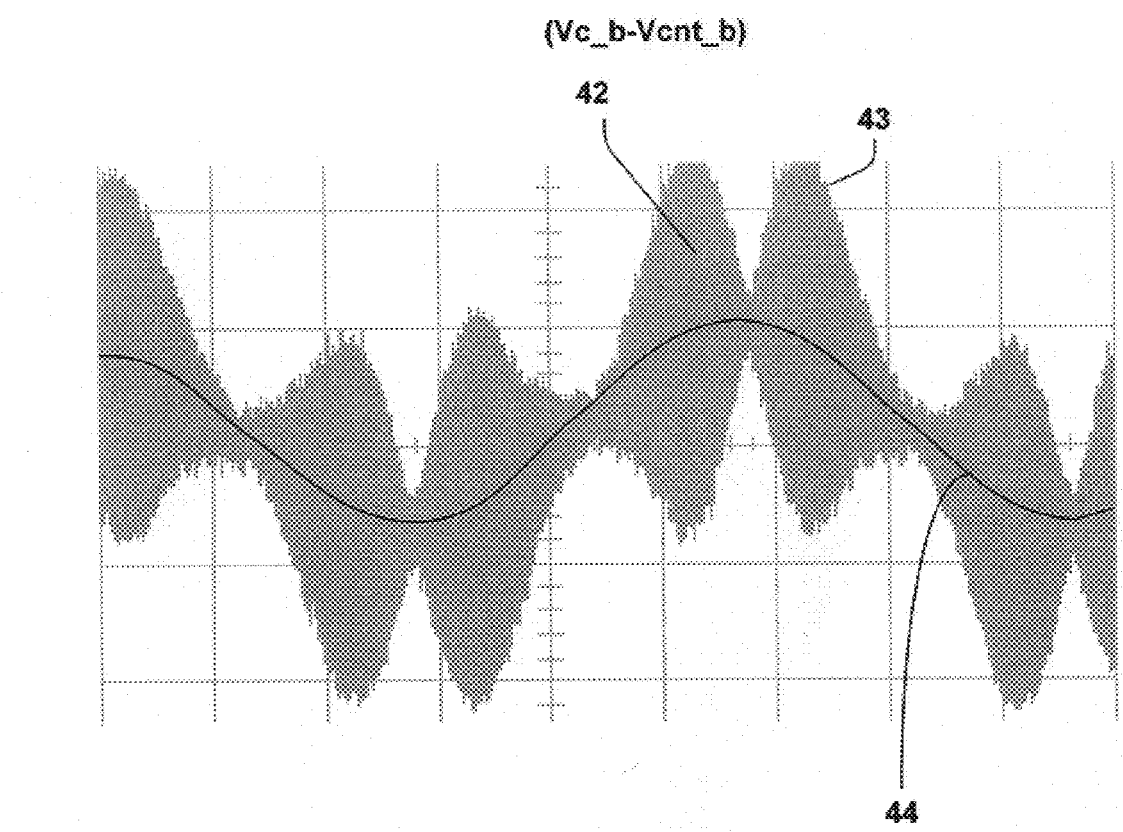
FIG. 3D is a graphical diagram illustrating another motor performance variable measured according to the circuit of FIG. 3A.

Referring also to FIG. 3D, a measurement of the voltage Vc_b−Vcnt_b in an actual motor is illustrated as a function of rotor position. The measurements illustrated in FIG. 3D were taken while the rotor was manually moved with phases a and b energized with a 5 kHz PWM signal and phase c floating. The waveform 42 was thus obtained, having a high frequency component in an envelope 43, riding along a low frequency sinusoidal curve 44. It will be noted that although the conventional model 10 suggests that the voltage Vc_b−Vcnt_b should be zero when there is no rotor movement, the measurements of FIG. 3D were taken while the rotor was moving. According to the conventional motor model 10, one would expect the voltage signal Vc_b−Vcnt_b to appear as a generally sinusoidal signal such as curve 44 (since the rotor is being manually rotated), corresponding solely to the back emf (e.g., Bemfc) associated with the floating phase. Once again, the conventional motor model 10 of FIG. 2 fails to simulate or predict this motor characteristic.

Figure 4A:
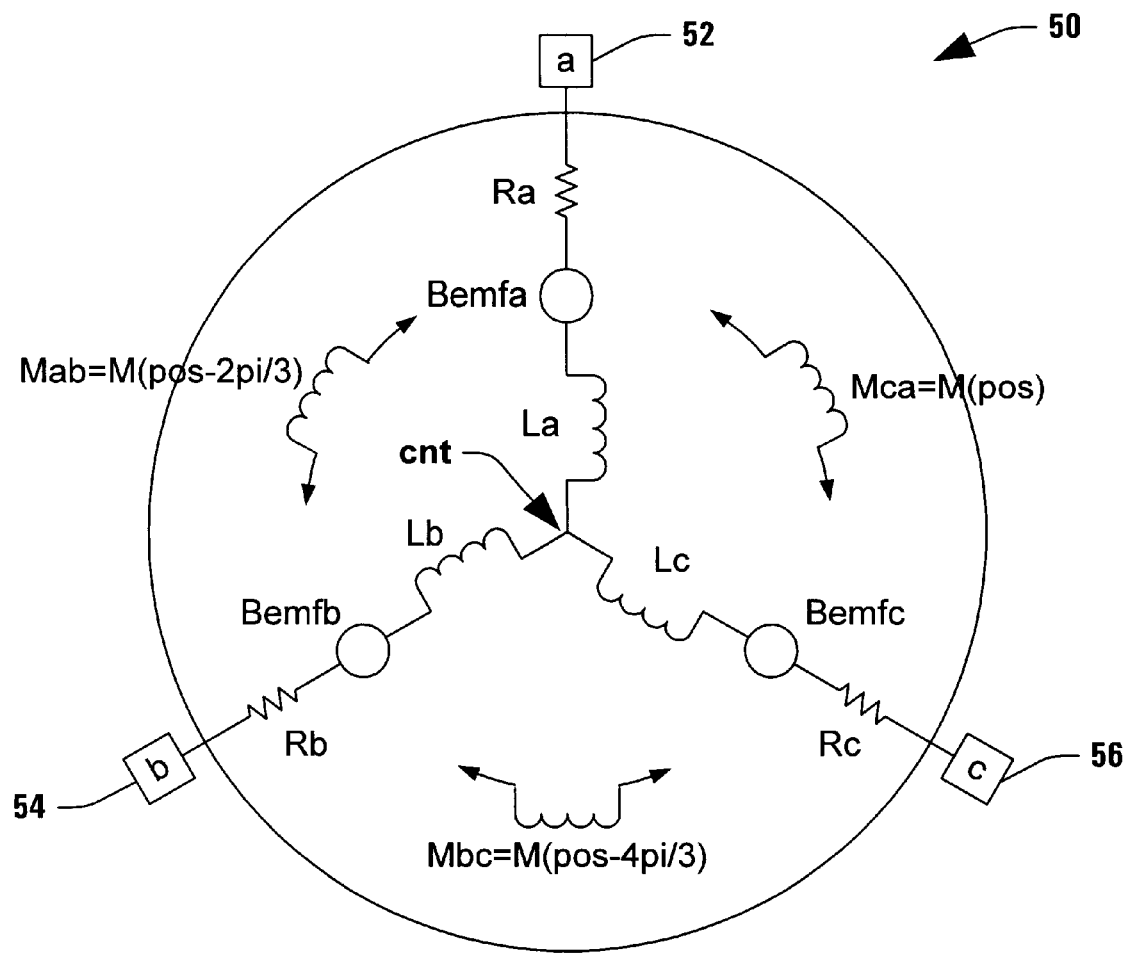
FIG. 4A is a schematic diagram illustrating an exemplary polyphase motor model in accordance with one aspect of the present invention.

Referring now to FIG. 4A, an exemplary model 50 of a polyphase electric motor according to one aspect of the present invention is illustrated having phases a, b, and c extending between first ends joined at a center tap cnt and second ends extending outward from the center tap cnt to corresponding phase taps 52, 54, and 56. The model 50 further includes mutual inductance components Mab, Mca, and Mbc disposed between phases a and b, c and a, and b and c, respectively. As described hereinafter, the mutual inductance components Mab, Mca, and Mbc have been found to be a function of rotor position, having a 120 electrical degree phase relationship there between. The phases a, b, and c have a phase resistance component (e.g., Ra, Rb, and Rc, respectively), a back emf component (e.g., Bemfa, Bemfb, and Bemfc, respectively), and a phase inductance component (e.g., La, Lb, and Lc, respectively), serially connected between the corresponding phase tap and the center tap. In addition to the mutual induction components Mab, Mca, and Mbc, the phase inductance components have also been found to be a function of rotor position.

The model 50 provides a more accurate motor representation which provides insight into the actual motor performance characteristics illustrated in FIGS. 3B and 3D. In particular, the variation of the center tap voltage with respect to rotor position, and the deviation of the floating phase voltage from the back emf value as a function of the rotor position, are accounted for in the model 50, whereas the conventional model (e.g., model 10) did not explain this motor behavior.

Figure 4B:
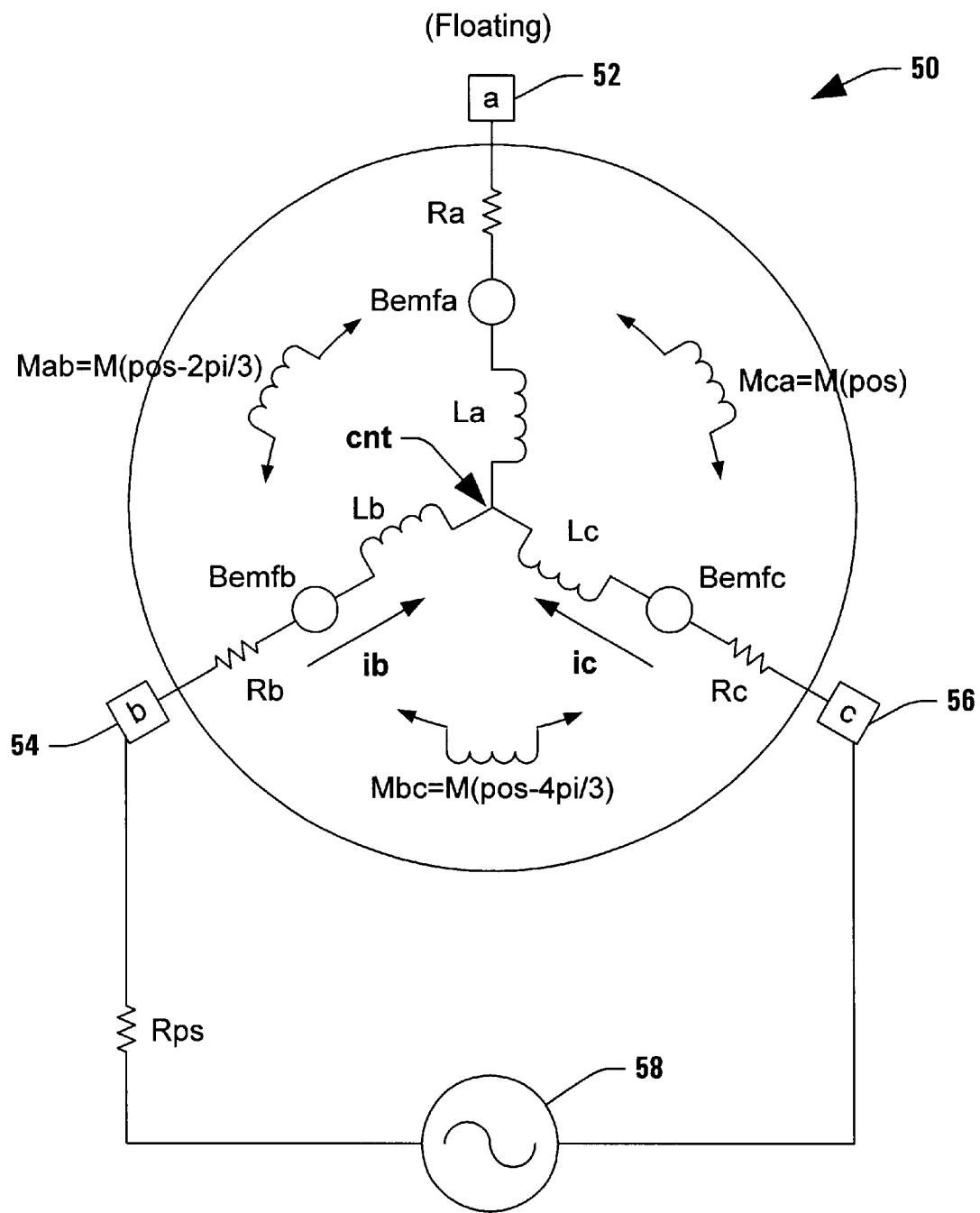
FIG. 4B is a schematic diagram illustrating a test circuit including the exemplary polyphase motor model of FIG. 4A.

Referring now to FIG. 4B, it has been found by the inventors of the present invention that the phase to phase mutual inductance components Mab, Mca, and Mbc vary with the rotor position due to variations in the reluctance in the path of the motor air gap flux between the rotor and stator. This is because, although the phase windings in the exemplary motor 2 of FIG. 1 are 120 electrical degrees apart, they are physically proximate one another in accordance with the stator winding pattern or configuration. Assuming zero rotor speed, the model 50 may be used to verify the measurements of FIG. 3B. As illustrated in FIG. 4B, an AC power source 58 is connected between phases b and c using phase taps 54 and 56, respectively, causing currents ib and ic to flow. The voltage across taps 54 and 56 is given by the following equation according to the model 50:

$$V_{bc}=V_{b\_cnt}-V_{c\_cnt},$$

where $V_{b\_cnt}$ is the voltage across phase b and $V_{c\_cnt}$ is the voltage across phase c. Considering the phase inductance components Lb and Lc as well as the mutual inductance component Mbc, the above equation may be rewritten as follows:

$$V_{bc}=(i_bR_b+L_b di_b/dt-M_{cb}di_c/dt)-(i_cR_c+L_c di/dt-M_{bc}di_b/dt).$$

Since $i_b=-i_c=i$, and assuming $R_b=R_c=R$, the equation may be simplified and rewritten as follows:

$$V_{bc}=i(2R)+(L_b+L_c+2M_{bc})di/dt,$$

where the term $(L_b+L_c+2M_{bc})$ is the motor phase to phase inductance.

In addition, since the rotor speed is assumed to be zero, the floating phase back emf (e.g., Bemfa) may be assumed to be zero as well. Due to the phase to phase mutual inductance components Mab and Mca, the floating phase voltage may be written as:

$$V_{a\_cnt} = -M_{ab}di_b/dt - M_{ca}di_c/dt$$
$$= -M_{ab}di/dt - M_{ca}d(-i)/dt$$
$$= (M_{ca} - M_{ab})di/dt$$
$$= M_{a\_bc}di/dt$$

where $M_{a\_bc}=M_{ca}-M_{ab}$ is the equivalent mutual inductance of the two conducting phases b and c with respect to the floating phase a. Thus the floating phase voltage $V_{a\_cnt}$ is zero (assuming the rotor speed and hence the back emf Bemfa is zero, and that the di/dt is non-zero) when $M_{a\_bc}$ is zero, i.e. when $M_{ab}=M_{ca}$. However, this is true only when either the magnet pole of the permanent magnet rotor (e.g., rotor 6 of FIG. 1) is aligned with a floating phase winding (e.g., phase a), or when the mid point between adjacent rotor magnet poles is aligned with such a phase winding.

Hence, while phase windings b and c are energized, the flux paths associated therewith will change as the rotor moves, resulting in a corresponding change in the reluctance of the air gap flux between the rotor and the stator. As the reluctance increases, the mutual inductance also increases. This is due to the saturating effect of the rotor magnet poles. When the magnet pole is proximate an energized winding where the phase current generates flux of the same polarity as the proximate rotor pole, the air gap flux tends to saturate, thereby reducing the magnetic effect of current flowing through the winding. When the pole moves away from the winding, the magnetic effect of the winding current is more pronounced. Thus, it will be appreciated to those skilled in the art that the mutual inductance components Mab, Mbc, and Mca of the motor model 50 vary with rotor position, due to the reluctance variation as the rotor position changes. It will be further noted that the mutual inductance components Mab, Mbc, and Mca may also be a function of motor current, and that the phase inductance components La, Lb, and Lc may be a function of motor current.

The model 50 therefore explains why the floating phase voltage measurements for actual motors is not equal to the back emf associated therewith, but instead is a function of rotor position due to the mutual inductance components Mab, Mbc, and Mca. The mutual inductance components of the model 50 account for the transformer effect of the changing reluctance in the motor air gap flux, caused by the relative position of the phase windings and the rotor magnet poles. Referring also to FIG. 3D, the mutual inductance components of the model 50 account for the transformer coupling of the PWM energy into the floating phase, which is superimposed on the lower frequency back emf waveform 44, whereby the composite signal 42 is measured at the motor terminals.

Figure 5:
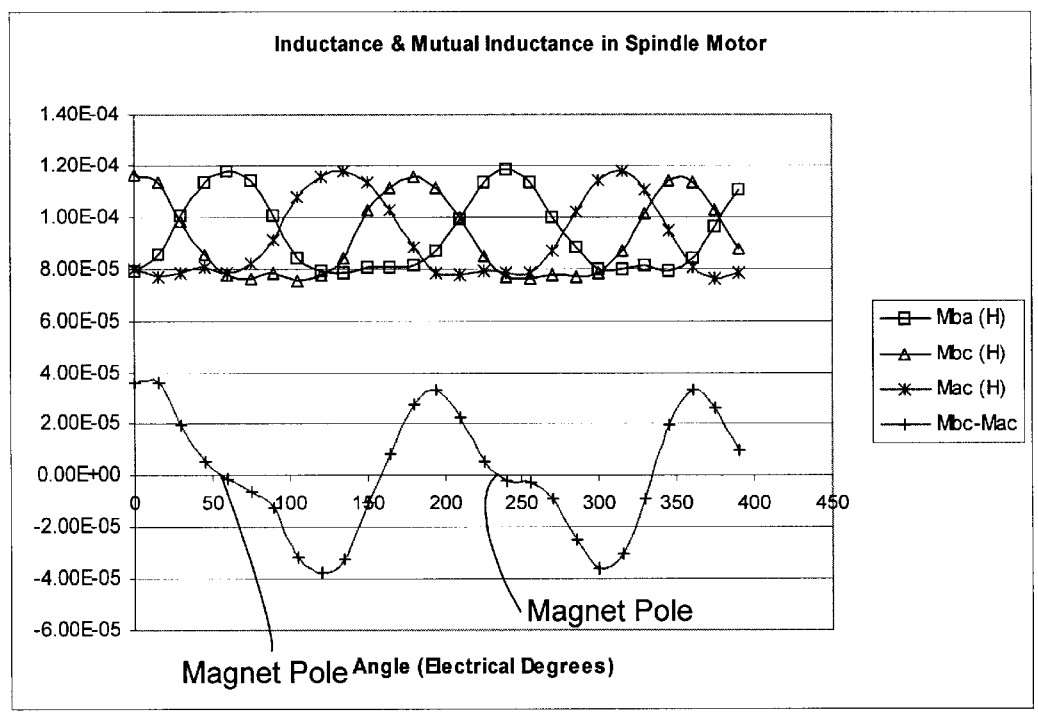
FIG. 5 is a graphical diagram illustrating four spindle motor mutual inductance variables as a function of rotor position.

Referring also to FIG. 5, the mutual inductances Mba, Mbc, and Mac are plotted as a function of rotor position in a mass storage device disk drive spindle motor, along with the equivalent mutual inductance Mbc–Mac. It is thus seen, for example, that the positional variation in the equivalent mutual inductance Mbc–Mac accounts for the difference between Vc_b and Vcnt_b in FIG. 3B (no rotor motion), as well as the measured high frequency signal 42 superimposed on the back emf signal 44 of FIG. 3D (rotor moving). In particular, the signal 42 includes a back emf component 44, a high frequency excitation component (e.g., related to a high frequency PWM excitation in the energized phase windings), and a mutual inductance component (e.g., the envelope of the high frequency excitation component). It will also be noted that the equivalent mutual inductance Mc_ab (e.g., =Mbc–Mac) alternates between positive and negative values depending on the rotor position.

It will be noted in this regard that where a motor phase (e.g., phase c) is floated (e.g., during position measurement in a commutation scheme), the equivalent mutual inductance component (e.g., Mbc–Mac) of the conducting phases (e.g., phases a and b) will pass through zero at four points in one angular electrical revolution of the rotor. In particular, the mutual inductance Mbc–Mac passes through zero where a rotor magnet pole is aligned with the floating phase, as well as where the floating phase is aligned with a pole boundary between adjacent rotor magnet poles. In accordance with one aspect of the invention, therefore, the zero crossing or polarity of the mutual inductance may be used to determine the rotor position.

Figure 6:
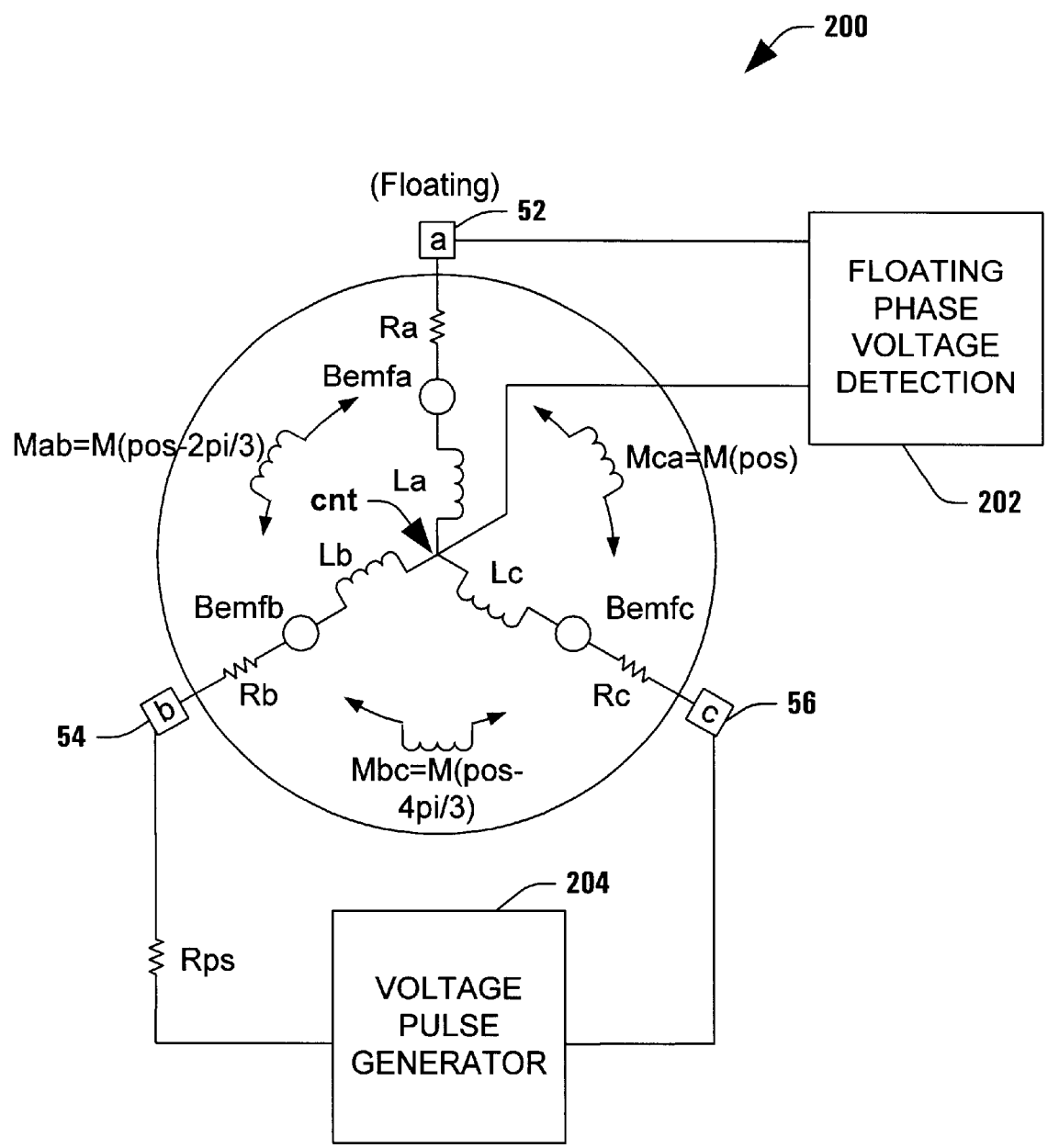
FIG. 6 is schematic diagram illustrating an exemplary apparatus for detecting stationary rotor position in a polyphase electric motor in accordance with an aspect of the invention.

Referring now to FIG. 6, an exemplary apparatus 200 is illustrated for detecting stationary rotor position in a polyphase electric motor. The apparatus 200 includes a floating phase voltage detection component 202 adapted to measure a floating phase voltage (e.g., across phase a), while a pair of other phase windings (e.g., phases b and c) are energized via a voltage pulse generator 204. For example, the voltage Va–Vcnt across a floating motor phase (e.g. phase a) may be measured while phases b and c are energized with a short voltage pulse. The applied voltage pulse (e.g., around 12 v) may have a duration of less than about 0.01 ms in accordance with an aspect of the invention, whereby fast rotor position determinations may be achieved.

The voltage pulse generates a di/dt in the energized phase windings b and c. Due to the equivalent mutual inductance of the energized phases b and c with respect to the floating phase a, the polarity of the induced voltage measured by component 202 (e.g., the product of the equivalent mutual inductance and di/dt) on floating phase a may be measured. Because the polarity of the equivalent mutual inductance varies as a function of rotor position, and because the polarity of the induced floating phase voltage depends on the equivalent mutual inductance polarity, this measurement may be used to determine the rotor position. Continuing in this fashion, a voltage pulse may be generated across the other phase pairs of the motor, while the induced voltages on the floating phases (e.g., and the polarities thereof are measured.

Figure 7:
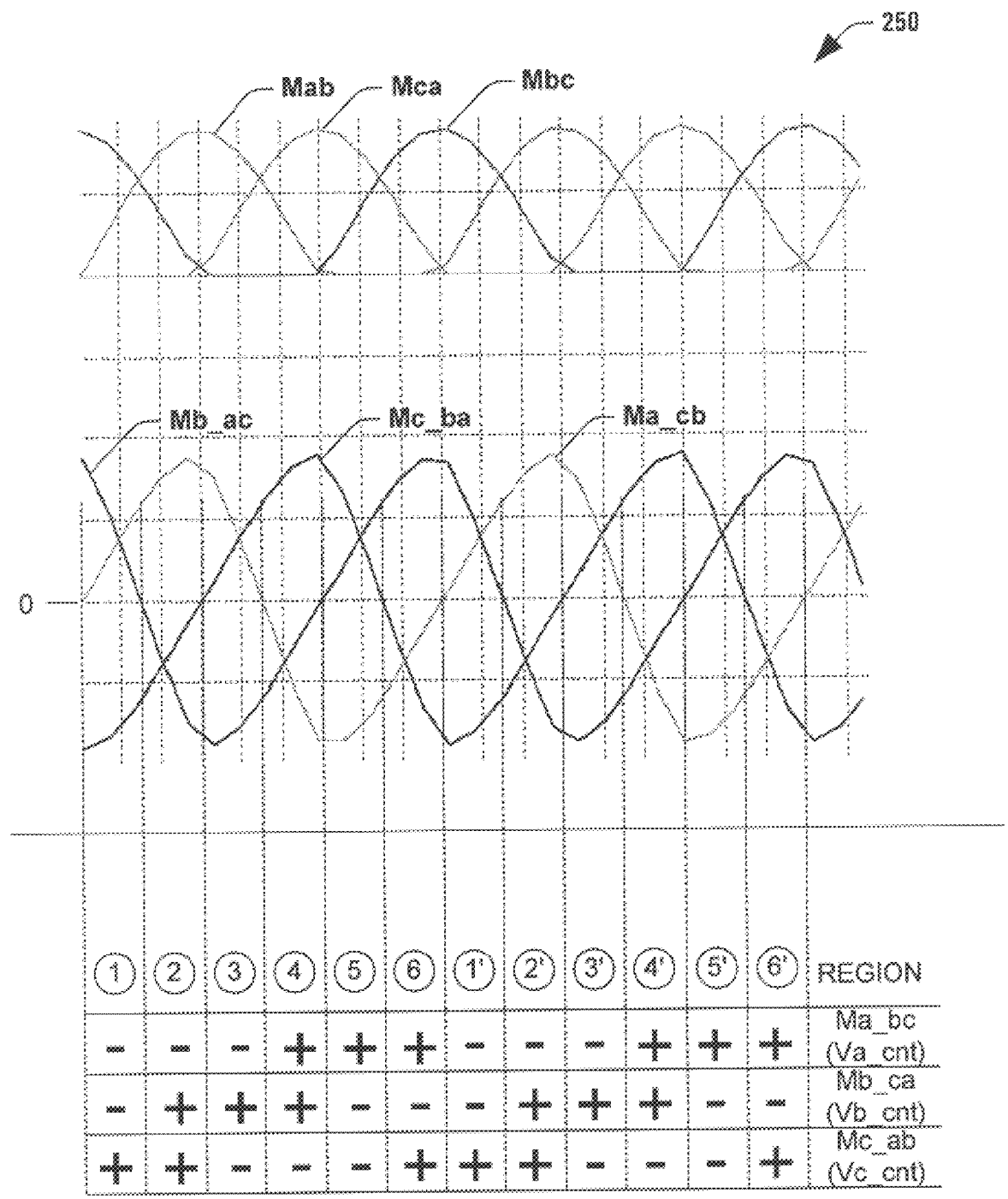
FIG. 7 is a graphical illustration of three exemplary motor mutual inductances and three equivalent mutual inductances as a function of rotor position, together with a correlation of measured floating phase voltage polarities with one of six positional regions according to the invention.

Referring now to FIG. 7, an exemplary rotor position mapping 250 is illustrated wherein three exemplary motor mutual inductances Mab, Mca, and Mbc along with three equivalent mutual inductances Ma_bc, Mc_ab, and Mb_ca are plotted versus rotor position through one electrical revolution. The mutual inductances Ma_bc, Mc_ab, and Mb_ca represent the equivalent mutual inductance of two energized phases in a three phase motor with respect to a third floating phase. For example, inductance Ma_bc represents the equivalent mutual inductance of energized phases b and c with respect to floating phase a.

It will be noted that the equivalent mutual inductances Ma_bc, Mc_ab, and Mb_ca each pass through zero at four points in each rotor electrical revolution, with the zero crossings for the three mutual inductances being spaced 120 electrical degrees from one another. It will further be appreciated that two of the four equivalent mutual inductance zero crossings in each electrical revolution correspond to a rotor pole being aligned with a floating phase, and the remaining two zero crossings correspond to floating phase winding alignment with a rotor pole boundary.

Twelve regions may be defined between the equivalent mutual inductance zero crossings (regions 1, 2, 3, 4, 5, 6, 1', 2', 3', 4', 5', and 6'), wherein the polarities of the three equivalent mutual inductances Ma_cb, Mc_ba, and Mb_ac are illustrated in FIG. 7. It will be further appreciated that in any of these positional regions, two of the equivalent mutual inductances will have a polarity opposite that of the third mutual inductance. By knowing the polarities of these mutual inductances, the rotor position may thus be correlated to one of six positional regions, wherein it is noted that the mutual inductance polarities are the same in two 30 degree electrical angular partitions on opposite sides of the motor (e.g., region 2 and region 2').

In accordance with an aspect of the invention, the mapping 250 of FIG. 7 may be employed to determine a stationary rotor position in a polyphase electric motor. For example, a short voltage pulse (e.g., less than about 0.01 ms) may be applied between two motor phases (e.g., phases b and c) while the floating phase voltage (e.g., across phase a) is measured. This may be accomplished, for example, using the exemplary apparatus 200 of FIG. 6. By measuring the polarity of the floating phase voltage, the polarity of the equivalent mutual inductance of the energized phases with respect to the floating phase may be determined, since the polarity of these equivalent mutual inductances varies with rotor position.

This process may then be repeated for the remaining phases, whereby three floating phase voltages may be obtained. The three polarities thereof may be correlated with one of six positional regions (e.g., regions 1, 2, 3, 4, 5, and 6) according to the mapping 250. Because the equivalent mutual inductance crosses through zero where a phase winding is aligned with either a rotor pole or a pole boundary between two rotor poles, the correlation may be used to identify a motor phase closest to a proximate rotor pole according to the floating phase voltage polarity measurement. Also in FIG. 7, exemplary mutual inductances Mab, Mca, and Mbc are plotted versus position, each having flat curve portions. The inventors of the present invention have found that the flat portions may be correlated with the phase winding closest to a proximate rotor pole.

In addition, it has been found that the relative flatness of the slope of the equivalent mutual inductance curves for Ma_cb, Mc_ba, and Mb_ac as they cross through zero may be used to determine whether a particular zero crossing corresponds with a proximate rotor pole or a proximate rotor pole boundary. For example, the inventors of the present invention have found that the flattest or straightest mutual inductance zero crossing slope (e.g., the upward transition through zero in FIG. 7) corresponds to floating phase alignment with a rotor pole. This information may be used to determine which phase winding is proximate a rotor pole for a given positional region in the mapping 250. Once this relationship is known, the identification of a particular region in the mapping may be correlated with an appropriate commutation sequence in order to start a stationary motor in a desired direction.

For example, where a sequence of three voltage pulses and corresponding floating phase voltage polarity measurements indicate positional region 2 in FIG. 7, the equivalent mutual inductance Mc_ba transitions through zero in an upward direction between regions 2 and 3, thus indicating that phase winding c is close to a rotor pole in these regions. Accordingly, for the exemplary mapping 250 of FIG. 7, the inventors have found that motor phase a is closest to the proximate rotor pole for regions 1 and 6, phase b is closest for regions 4 and 5, and phase c is closest for regions 2 and 3. Thus, the identification of the positional region via floating phase voltage polarity measurements may be advantageously employed to identify a motor phase winding closest to a rotor pole. It will be appreciated that because the short voltage pulses employed in the present invention are much shorter that the long duration pulses employed in previous methods (e.g., 0.2 to 0.5 ms, depending on motor), the rotor position may now be determined in much less time than was previously required in the prior art.

According to another aspect of the invention, two current pulses (e.g., of opposite polarities) may thereafter be applied to the motor phase winding proximate the rotor pole and one motor phase distal to the proximate rotor pole (or the center tap), whereby the polarity of the proximate rotor pole may be determined according to the rise times associated with the resulting currents. The current pulses may be applied, for example, via the provision of two long duration voltage pulses, in order to provide a saturation effect in association with the energized winding. For example, where positional region 2 is identified using the three short duration voltage pulse method described above, the exemplary mapping 250 of FIG. 7 may be employed to determine that motor phase c is closest to a proximate rotor pole. In this case, the proximate motor phase c and one of the other phases (e.g., phases a or b, or alternatively the center tap cnt) may be energized by two long duration current pulses (e.g., 0.2 to 0.5 ms) in order to determine the magnetic polarity (e.g., North or South) of the rotor pole proximate to phase winding c.

The identification of a phase winding closest to a proximate rotor pole, in combination with the identification of the polarity of the proximate rotor pole allows optimal selection of an appropriate commutation signal pattern or sequence to start a stationary motor in a desired direction, without the chance of rotation in the wrong direction. The present invention provides for improved positional resolution in the ability to locate rotor position to within 30 electrical degrees in a typical three phase motor, whereas the prior six current pulse method provided only 60 electrical degree accuracy. Furthermore, the six current pulse method requires a significant amount of time for rotor position determination, whereas the present invention provides the necessary information quickly.

For example, six current pulses, each having durations of about 0.2 to 0.5 ms, depending on motor, requires at least 1.2 to 3.0 ms to identify rotor position within 60 electrical degrees. The present invention, on the other hand, requires about 0.03 ms for the short voltage pulses. The optional two current pulses may add another 0.4 to 1.0 ms. Thus, the present invention reduces the rotor position identification time to less than half that required under conventional methodologies, in addition to the above mentioned accuracy improvement. It will thus be appreciated that the employment of three short voltage pulses (e.g., less than about 0.01 ms) in accordance with the present invention significantly speeds up the process of determining stationary rotor position over the six current pulse method of previous systems.

Figure 8:
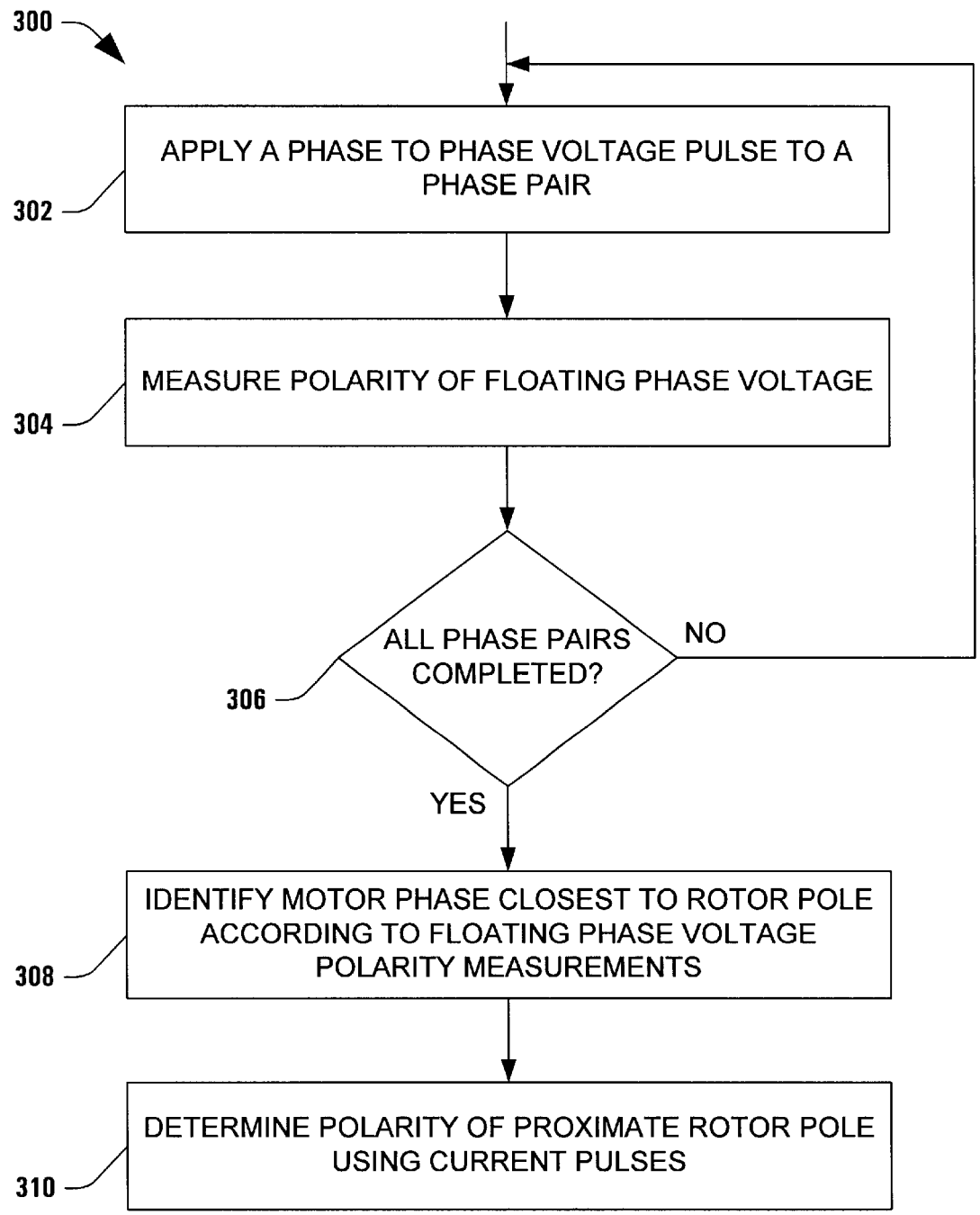
FIG. 8 is a flow diagram illustrating an exemplary method of determining a stationary rotor position in a polyphase electric motor according to another aspect of the invention.

Another aspect of the invention includes a method for determining stationary rotor position in a polyphase motor. Referring now to FIG. 8, an exemplary method 300 begins at step 302 where a phase to phase voltage pulse is applied to a phase pair in an electric motor (e.g., phases b and c). The polarity of a resulting voltage in a floating phase (e.g., phase a) is measured at step 304. As illustrated and described herein above, the polarity of the floating phase voltage may be correlated to the polarity of the equivalent mutual inductance of the energized pair of phase windings with respect to the floating phase winding. Once all such phase pairs (e.g., pair c and a, and pair a and b) have been energized and the corresponding floating phase voltages (e.g., across phases b and c) have been measured at decision step 306, the motor phase closest to a rotor pole is identified at step 308 according to the floating phase voltage polarity measurements performed at step 304. The identification at step 308 may be made, for example, using the exemplary positional region mapping 250 of FIG. 7.

Thereafter, in accordance with another aspect of the invention, the polarity of the rotor pole proximate the phase winding identified at step 308 optionally may be determined at step 310 using current pulses (e.g., two current pulses of opposite polarity). For example, this may be accomplished via comparing the rise times associated with the current pulses, in order to determine whether a rotor North or South pole is proximate the motor phase winding identified at step 308. It will be appreciated that with or without the current pulses employed at step 310, the method 300 accomplishes stationary rotor position determination in a much shorter time than was previously possible using the conventional six current pulse method. Thus, the present invention provides significant time savings in starting a polyphase motor.

While the stationary rotor position may be advantageously determined, for example, within 30 electrical degrees, in a three phase motor according to the polarity of the floating phase voltages as described supra, improved accuracy may be achieved using the equivalent mutual inductances of the motor. For example, the equivalent mutual inductances Mb_ac, Mc_ba, and Ma_cb illustrated in FIG. 7 each follow a determinate curve with respect to rotor position. Using this fact, the values of the floating phase voltages may be correlated to determine rotor position to a high degree of accuracy. The floating phase voltage values may be measured, for example, using an analog to digital converter. Thus, while the floating phase voltage polarity measurements may achieve a resolution of 30 electrical degrees in a typical three phase motor, where the values of the floating phase voltages are measured, still greater resolution may be attained.

Figure 9:
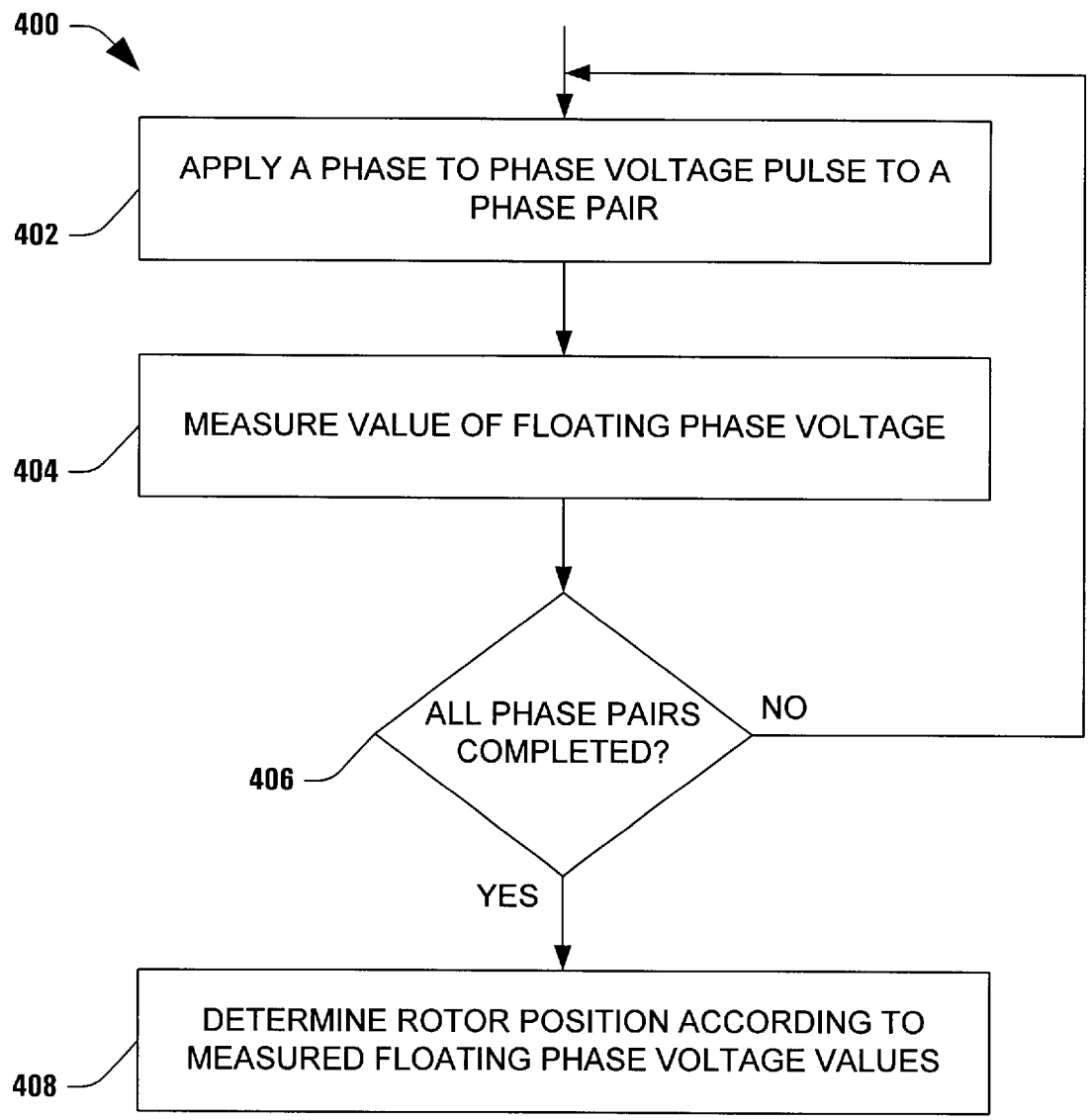
FIG. 9 is a flow diagram illustrating another exemplary method of determining a stationary rotor position in a polyphase electric motor according to another aspect of the invention.

Referring now to FIG. 9, another exemplary method 400 for determining stationary rotor position begins at step 402 where a phase to phase voltage pulse is applied to a phase pair in an electric motor (e.g., phases b and c). The value of a resulting voltage in a floating phase (e.g., phase a) is measured at step 404. Once all such phase pairs (e.g., pair c and a, and pair a and b) have been energized and the corresponding floating phase voltages (e.g., across phases b and c) have been measured at decision step 406, the rotor position is determined at step 408 according to the floating phase voltage value measurements performed at step 404. The determination of rotor position may be performed at step 408, for example, according to the exemplary equivalent mutual inductance curves illustrated in FIG. 7, whereby improved positional accuracy is obtained.

Although the invention has been shown and described with respect to a certain preferred applications or implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several implementations, such feature may be combined with one or more other features of the other implementations as may be desired and advantageous for any given or particular application.

What is claimed is:

1. A method of detecting a stationary rotor position in a polyphase electric motor, comprising:

measuring a mutual inductance of the motor by using zero crossing of said polyphase electric motor; and determining the stationary rotor position according to the measured mutual inductance.

2. The method of claim 1, wherein measuring a mutual inductance of the motor comprises applying a voltage pulse across a pair of phases and measuring a floating phase voltage.

3. The method of claim 2, wherein the voltage pulse has a duration of less than about 0.01 ms.

4. The method of claim 2, wherein measuring a mutual inductance of the motor further comprises measuring the polarity of the floating phase voltage, and wherein determining the rotor position according to the measured mutual inductance comprises identifying a motor phase closest to a proximate rotor pole according to the floating phase voltage polarity measurement.

5. The method of claim 4, wherein identifying a motor phase closest to a proximate rotor pole according to the floating phase voltage polarity measurement comprises correlating the floating phase voltage measurement with one of six positional regions.

6. The method of claim 4, further comprising:

injecting first and second current pulses into the pair of phases, wherein the first and second current pulses are of opposite polarity;

sensing first and second voltage signals induced by the first and second current pulses, respectively;

measuring first and second rise times associated with the first and second voltage signals; and determining a polarity of the proximate rotor pole according to the first and second rise times associated with the first and second voltage signals.

7. The method of claim 1, wherein the motor comprises first, second, and third phases, further comprising:

measuring first, second, and third mutual inductances associated with the first, second, and third phases, respectively; and determining the rotor position according to the first, second, and third mutual inductances.

8. The method of claim 7, wherein measuring the first, second, and third mutual inductances comprises:

applying a first voltage pulse across the second and third phases while measuring a first floating phase voltage across the first phase;

applying a second voltage pulse across the third and first phases while measuring a second floating phase voltage across the second phase; and applying a third voltage pulse across the first and second phases while measuring a third floating phase voltage across the third phase.

9. The method of claim 8, wherein the first, second, and third voltage pulses have a duration of less than about 0.01 ms.

10. The method of claim 8, wherein measuring the first, second, and third mutual inductances further comprises measuring a polarity of the first, second, and third floating phase voltages, and wherein determining the rotor position according to the first, second, and third mutual inductances comprises identifying a motor phase closest to a proximate rotor pole according to the first, second, and third floating phase voltage polarity measurements.

11. The method of claim 10, wherein identifying a motor phase closest to a proximate rotor pole according to the first, second, and third floating phase voltage polarity measurements comprises correlating the first, second, and third floating phase voltage polarity measurements with one of six positional regions.

12. The method of claim 11, wherein the one of six positional regions represents two 30 degree electrical angular partitions on opposite sides of the motor.

13. The method of claim 10, further comprising:
injecting first and second current pulses into the pair of phases, wherein the first and second current pulses are of opposite polarity;
sensing first and second voltage signals induced by the first and second current pulses, respectively;
measuring first and second rise times associated with the first and second voltage signals; and
determining a polarity of the proximate rotor pole according to the first and second rise times associated with the first and second voltage signals.

14. A method of detecting a stationary rotor position in a polyphase electric motor having first, second, and third phases, the method comprising:
applying a first voltage pulse across the second and third phases while measuring a first floating phase voltage across the first phase during zero crossing of the first phase;
applying a second voltage pulse across the third and first phases while measuring a second floating phase voltage across the second phase during zero crossing of the second phase;
applying a third voltage pulse across the first and second phases while measuring a third floating phase voltage across the third phase during zero crossing of the third phase; and
determining the stationary rotor position according to the measured first, second, and third floating phase voltages.

15. The method of claim 14, wherein the first, second, and third voltage pulses have a duration of less than about 0.01 ms.

16. The method of claim 14, wherein measuring the first, second, and third floating phase voltages comprises measuring a polarity of the first, second, and third floating phase voltages.

17. The method of claim 16, wherein determining the stationary rotor position according to the measured first, second, and third floating phase voltages comprises identifying one of the first, second, and third phases as a motor phase closest to a proximate rotor pole according to the first, second, and third floating phase voltage polarity measurements.

18. The method of claim 17, wherein identifying one of the first, second, and third phases as the motor phase closest to a proximate rotor pole according to the first, second, and third floating phase voltage polarity measurements comprises correlating the first, second, and third floating phase voltage polarity measurements with one of six positional regions.

19. The method of claim 18, wherein the one of six positional regions represents two 30 degree electrical angular partitions on opposite sides of the motor.

20. The method of claim 14, wherein measuring the first, second, and third floating phase voltages comprises measuring a value of the first, second, and third floating phase voltages.

21. The method of claim 20, wherein determining the stationary rotor position according to the measured first, second, and third floating phase voltages comprises correlating the values of the measured floating phase voltages with mutual inductances in the motor.

22. An apparatus for detecting a stationary rotor position in a polyphase electric motor having first, second, and third phases, comprising:
a first circuit adapted to apply a first voltage pulse across the second and third phases and to measure a first floating phase voltage across the first phase by the zero crossing of the first phase;
wherein the first circuit is further adapted to apply a second voltage pulse across the third and first phases and to measure a second floating phase voltage across the second phase by the zero crossing of the second phase;
wherein the first circuit is further adapted to apply a third voltage pulse across the first and second phases and to measure a third floating phase voltage across the third phase by measuring the zero crossing of the third phase; and
a second circuit adapted to determine the stationary rotor position according to the measured first, second, and third floating phase voltages.

23. The apparatus of claim 22, wherein the first, second, and third voltage pulses have a duration of less than about 0.01 ms.

24. The apparatus of claim 23, wherein the first circuit is further adapted to measure the polarity of the first, second, and third floating phase voltages.

25. The apparatus of claim 24, wherein the second circuit is further adapted to identify one of the first, second, and third phases as a motor phase closest to a proximate rotor pole according to the first, second, and third floating phase voltage polarity measurements.

26. The apparatus of claim 25, wherein the second circuit is further adapted to identify correlate the first, second, and third floating phase voltage polarity measurements with one of six positional regions.

27. The apparatus of claim 26, wherein the one of six positional regions represents two 30 degree electrical angular partitions on opposite sides of the motor.

* * * * *